October 22, 1963

United States Patent Office 3,108,101
Patented Oct. 22, 1963

3,108,101
PROCESS FOR THE SYNTHESIS OF TRIAZINES
Donald K. George, Baltimore, and William B. Tuemmler, Catonsville, Baltimore, Md., assignors to FMC Corporation, a corporation of Delaware
No Drawing. Filed June 2, 1959, Ser. No. 817,495
6 Claims. (Cl. 260—248)

This invention relates to a novel process for the preparation of triazines, and particularly to a new and improved process for the synthesis of esters of 1,3,5-tris-(carboxy)-hexahydro-s-triazine, of the general formula

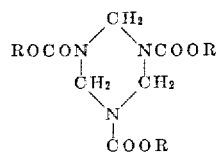

Heretofore, certain compounds of this class, such as those wherein R in the above formula is methyl or ethyl, have been prepared by the acid-catalyzed reaction of methyl or ethyl carbamate with formaldehyde. The mechanism of that reaction and the structure of the products have been discussed by Marvel et al. in J. Am. Chem. Soc. 68, 1681 (1946). When higher alkyl carbamates are condensed with formaldehyde the products are viscous or solid polymers, such as are described in U.S. Patent 1,169,991. In copending patent application Ser. No. 801,457, filed March 24, 1959, is described a method for converting the viscous polymers produced from the reaction of higher alkyl carbamates with formaldehyde into the corresponding monomeric hexahydrotriazines. Prior to that discovery, tris(carbalkoxy)-hexahydrotriazines derived from higher alkyl groups were unavailable.

We have now discovered a much simpler process for the preparation of esters of tris(carboxy)-hexahydrotriazine. By means of this process, tris(carboxy)-hexahydrotriazine esters of virtually any structure may be prepared, including many that have heretofore been unavailable. According to our discovery, these tris(carboxy)-hexahydrotriazine esters are prepared directly from ammonia, formaldehyde and a chloroformate, by first combining the ammonia and formaldehyde to form hexahydrotriazine itself, and then reacting this intermediate, without isolation, with the appropriate chloroformate in the presence of an acid acceptor.

By this process, hexahydrotriazines are produced without preparation of the intermediate carbamate, as was heretofore required for the lower alkyl derivatives. For the higher alkyl derivatives which, as stated above, were unavailable prior to the preparation thereof described in copending application Ser. No. 801,457, both the preparation of the intermediate carbamate and the formation and degradation of the intermediate polymer are eliminated. Further, by the novel process of this invention may now be prepared an assortment of esters not available from previous processes because of the presence of reactive groups, such as unsaturation, or such functional groups as hydroxyl or halogen which may be unstable with heat, or such substituents as epoxy groups which may be unstable in acid.

The process of this invention is shown in the following equation:

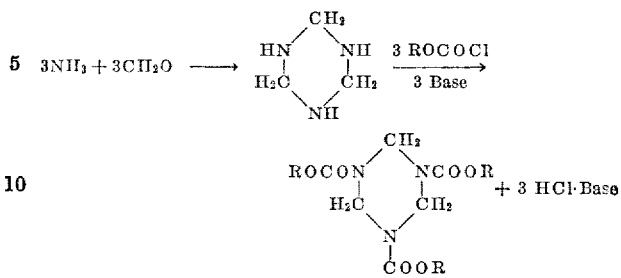

In the above formulae, R may be any organic radical. The success of the reaction does not depend on the nature of the R group, but rather on the reaction of the chlorine of the chloroformate with the reactive hydrogens of the freshly formed hexahydrotriazine. Thus, R may be straight and branched chain alkyl, including methyl, ethyl, isopropyl, butyl, isoctyl, dodecyl, stearyl, and the like, substituted alkyl such as hydroxyethyl, chloropropyl and the like, alkenyl such as allyl, methallyl, isobutenyl, and the like, aralkyl such as benzyl and phenylethyl, cycloalkyl such as cyclohexyl, methylcyclohexyl, cyclopentyl and the like, aryl such as phenyl, naphthyl, biphenyl, substituted phenyl and the like, and heterocyclic such as furyl and the like. Mixtures of chloroformates may also be used, and chloroformates substituted with various groups such as hydroxyl, halogen, epoxy, and other groups which may be desired to impart particular properties to the products.

In the first stage of this reaction, equimolar amounts of ammonia and formaldehyde are reacted in aqueous solution to form hexahydro-s-triazine. The ammonia and formaldehyde are conveniently employed as the aqueous solutions of commerce, although solid forms of formaldehyde, or concentrated ammonia, may also be used. The solution should be sufficiently dilute to facilitate control of this exothermic reaction, and it is preferred to maintain the reactants at about 25° C. or lower, with external cooling, to minimize side reactions. Best results are obtained at about 0° C., keeping the ammonia and formaldehyde solutions at low temperatures and using the hexahydro-s-triazine promptly or, if it is necessary to store it, keeping it at low temperatures. It has been found that the use of a slight excess of formaldehyde, and the addition of the ammonia to the formaldehyde instead of the reverse, also minimize side reactions. Side products formed include methylene diamine, which may be converted into a methylene-bis-carbamate on reaction with the chloroformate, and hexamethylenetetramine, which is formed by further reaction of formaldehyde and ammonia with the hexahydrotriazine as it is produced.

The hexahydro-s-triazine, preferably in cold aqueous solution as formed, is then reacted with the chloroformate in alkaline solution. Stoichiometric amounts may be used, or a slight excess of chloroformate if desired. There is no advantage to using large excesses of chloroformate. This reaction occurs readily, is highly exothermic, and generally requires external temperature control. The reaction occurs rapidly at temperatures of room temperature or below. Sufficient acid acceptor is added to combine with the hydrogen chloride formed, to facilitate completion of the reaction. It is preferred to use an inorganic base as the acid acceptor, including strong bases such as the alkali metal and alkaline earth hydroxides, and weak bases such as the metallic carbonates, bicarbonates, acetates and other salts of weak acids. Pyridine and tertiary amines may also be used; but primary or secondary amines may complicate the reaction, and should be avoided. The exact nature of the acid acceptor is not important, and the choice may be controlled by reasons of economy. If excess formaldehyde had been employed in preparing the hexahydrotriazine, enough excess base should be added to compensate for any residual acidity; this is conveniently accomplished by making the solution alkaline prior to addition of the chloroformate and acid acceptor.

When the reaction is complete, the product may be separated and purified by standard procedures, such as extraction, and distillation or crystallization. The lower alkyl tris(carboxy)-hexahydrotriazines are crystalline solids, and are useful components of synthetic resins; for example, they may be transesterified with higher boiling polyols to form polyesters. The higher analogs, starting with butyl, are oily liquids to resinous solids, depending on the chloroformic ester used. They are useful as lubricants, especially because of their stability at elevated temperatures. They are characterized by compatibility with nitrocellulose, polyvinyl chloride and other resins, and are useful plasticizers therefor. The unsaturated esters of tris(carboxy)-hexahydrotriazines may be polymerized and copolymerized to form thermoplastic resins capable of further reaction, and thermosetting resins; they are also useful drying oils. Flame retardancy may be imparted, for example, by the use of chlorine-substituted chloroformates.

The invention is illustrated further in the following examples, for the preparation of representative esters of tris(carboxy)-hexahydrotriazine by the process of this invention. All parts are by weight unless otherwise indicated.

*Example I.—Preparation of 1,3,5-Tris(Carbobutoxy)-Hexahydro-s-Triazine*

Four hundred and eighty parts of 44% formalin were stirred and maintained at 5–10° C. while adding dropwise 295 parts of 29% aqueous ammonia. To the resulting clear solution of crude hexahydro-s-triazine were added excess dilute sodium hydroxide and 680 parts of 97% n-butyl chloroformate. The temperature was maintained at 5–10° C. during the chloroformate addition. The reaction mixture was then allowed to warm to room temperature and stirred for 45 minutes. The organic layer was separated, washed free of formaldehyde with dilute sodium sulfite solution, and then washed several times with hot water. The washed product was dried by distillation at 20 mm. Hg pressure to an internal temperature of 150° C. The residue was filtered, to yield 525 parts of a colorless oil, having a viscosity of 1.8 poises at 25° C., and a refractive index $n_D^{25}$ 1.4683. After removing a head's cut, the major fraction boiled at 217–222° C. at 0.5 mm. Hg. The material was a colorless, odorless oil having a viscosity of 1.4 poises at 25° C., $n_D^{25}$ 1.4673, $d_4^{25}$ 1.087. This material was identical by infrared spectra with an authentic sample of 1,3,5-tris-(carbobutoxy)-hexahydro-s-triazine.

This material was an efficient plasticizer for polyvinyl chloride, and exhibited excellent oil resistance.

*Example II.—Preparation of 1,3,5-Tris(Carbopentoxy)-Hexahydro-s-Triazine*

Three hundred and twenty-two parts of 29% aqueous ammonia and 375 parts of 44% formalin were condensed as in Example I and treated with excess dilute sodium hydroxide and 754 parts of 97% n-amyl chloroformate. The crude product was washed several times with hot water, and then stripped of volatiles at a final pressure of 2 mm. Hg. A total of 80 parts of material was removed during the vacuum stripping. The residue was filtered, to leave 567 parts of a colorless, odorless oil having a viscosity of 3.5 poises at 25° C., $n_D^{25}$ 1.4678. This material was shown by comparative infrared spectra to be 1,3,5-tris(carbopentoxy)-hexahydro-s-triazine.

This material was an efficient plasticizer for polyvinyl chloride, and exhibited excellent oil and water resistance.

*Example III.—Preparation of 1,3,5-Tris(Carboisobutoxy)-Hexahydro-s-Triazine*

Two hundred and fifty-eight parts of 29% aqueous ammonia and 300 parts of 44% formalin were reacted as in Example I. The resulting solution was treated with excess aqueous sodium hydroxide and 545 parts of isobutyl chloroformate. The product was worked up as in the previous examples to yield 413 parts of a colorless, odorless oil having a viscosity of 60 poises at 25° C. and $n_D^{25}$ 1.4655. This product was identified by infrared analysis as 1,3,5-tris(carboisobutoxy)-hexahydro-s-triazine.

This material was an efficient plasticizer for polyvinyl chloride, and exhibited excellent oil and water resistance.

*Example IV.—Preparation of 1,3,5-Tris(Carbopropoxy)-Hexahydro-s-Triazine*

Sixty-five parts of 29% aqueous ammonia and 50 parts of 44% formalin were reacted as in Example I and the resulting condensate was treated with dilute sodium hydroxide and 82 parts of n-propyl chloroformate. The product was worked up as in the previous examples to yield 40 parts of a colorless viscous oil which partially crystallized on standing. This material was identified by infrared analysis as 1,3,5-tris(carbopropoxy)-hexahydro-s-triazine.

*Example V.—Preparation of Tris(Carbethoxy)-Hexahydro-s-Triazine*

One hundred and seventy parts of 44% formalin and 115 parts of 29% aqueous ammonia were condensed as in the previous examples, and the condensate was treated with excess dilute sodium hydroxide and 216 parts of ethyl chloroformate. The reaction mixture was worked up as in the previous examples, to yield 105 parts of a colorless, very viscous oil which slowly crystallized on standing. A small sample of this material was recrystallized from ethanol-water solution to give a white crystalline solid melting at 98–100° C. (lit. 101–102° C.) which was substantially pure tris(carbethoxy)-hexahydro-s-triazine.

*Example VI.—Preparation of Tris(Carboallyloxy)-Hexahydro-s-Triazine*

One hundred and seventy parts of 44% formalin and 115 parts of 29% aqueous ammonia were condensed, and the condensate was treated with excess dilute sodium hydroxide and 220 parts of allyl chloroformate, as in the previous examples. The reaction mixture was worked up as before, to yield 135 parts of a colorless, odorless product, having a viscosity of about 60 poises at 25° C., $n_D^{25}$ 1.5071. The product was identified by infrared spectra as substantially pure tris(carboallyloxy)-hexahydro-s-triazine.

This material was an efficient oil-resistant plasticizer for nitrocellulose.

*Example VII.—Preparation of Tris(Carbobutoxy)-Hexahydro-s-Triazine*

Two hundred and eight parts of 95% paraformaldehyde and 354 parts of water were placed in a flask equipped with stirrer, thermometer and two addition funnels. The mixture was cooled to 10° C. and 348 parts 29% aqueous ammonia was added over 15 minutes. When the addition was complete, 832 parts n-butyl chloroformate and 400 parts 40% sodium hydroxide solution were added simultaneously at 10° C. over a 45 minute period. After agitating the reaction mixture for an additional 1.5 hours, the organic layer was removed, washed with warm water several times, dried and filtered. The product was 716 parts of an almost water-white oil, having a viscosity of 1.6 poises and a refractive index of 1.4668 at 25° C. and consisting almost entirely of 1,3,5-tris(carbobutoxy)-s-hexahydrotriazine.

*Example VIII.—Preparation of Tris(Carbohexyloxy)-Hexahydro-s-Triazine*

A crude hexahydrotriazine solution was prepared at 0° C. from 12.18 parts 37% formalin and 90 parts 29% ammonia. To this solution at 20° C. there was added 20 parts of sodium hydroxide in 200 parts water followed by 71 parts n-hexyl chloroformate, added over a 15 minute period. The mixture was stirred for an additional 1.5 hours at room temperature, after which the oil layer was removed, washed with water several times and dried over sodium sulfate. Residual volatile material was removed by heating at 130–150° C. for one hour under vacuum. The resulting product was a light-yellowish oil having a viscosity of 2 poises and a refractive index of 1.4632 at 25° C. Infrared analysis showed this product to consist principally of 1,3,5-tris(carbohexyloxy)-s-hexahydrotriazine.

*Example IX.—Preparation of 1,3,5-Tris(Carbo-2-Ethylhexoxy)-Hexahydro-s-Triazine*

Two hundred and thirty-four parts of 29% aqueous ammonia and 300 parts of 44% commercial formalin were condensed as in the previous examples, and the condensate was treated with excess dilute sodium hydroxide and 772 parts of 2-ethylhexyl chloroformate. After working up the product as before, there was obtained 650 parts of a colorless, odorless oil having a viscosity of 5.5 poises at 25° C. and $n_D^{25}$ 1.4670. On distillation of this product in a centrifugal molecular still there was obtained 343 parts of a pure fraction at a rotor temperature of 172–205° C. and 9–17 microns' pressure. The viscosity of this material was 3.4 poises at 25° C., $n_D^{25}$ 1.4671. Infrared analysis and comparison with an authentic sample identified the product as 1,3,5-tris(carbo-2-ethylhexoxy)-hexahydro-s-triazine.

This material was an efficient plasticizer for polyvinyl chloride, and exhibited excellent water resistance, color stability and low temperature flexibility.

It is apparent that this invention is susceptible to numerous modifications within the scope of the disclosure, and it is intended to include such variations within the scope of the following claims.

We claim:

1. The method of preparing esters of 1,3,5-tris(carboxy)hexahydro-s-triazines which comprises reacting equimolar amounts of ammonia and formaldehyde in aqueous solution at a temperature not in excess of 25° C., immediately reacting the resulting product mixture in cold aqueous solution with an equimolar amount of an organic chloroformate of the formula ROCOCl, wherein R is a member of the group consisting of alkyl, alkenyl, cycloalkyl of 5–6 carbon atoms in the ring, ar-lower-alkyl, hydrocarbon aryl of up to 12 carbon atoms, and furyl, and these moieties substituted by a member of the group consisting of hydroxyl, halogen and epoxy, in the presence of an acid acceptor, thus producing said 1,3,5,-tris(carboxy)hexahydro-s-triazine ester in high yield.

2. The method of preparing esters of 1,3,5-tris(carboxy)hexahydro-s-triazines which comprises reacting equimolar amounts of ammonia and formaldehyde in aqueous solution at a temperature not in excess of 25° C., maintaining the resulting product mixture continuously at a temperature not in excess of 25° C., reacting the product mixture in cold aqueous solution with an equimolar amount of an organic chloroformate of the formula ROCOCl, wherein R is a member of the group consisting of alkyl, alkenyl, cycloalkyl of 5–6 carbon atoms in the ring, ar-lower-alkyl, hydrocarbon aryl of up to 12 carbon atoms, and furyl, and these moieties substituted by a member of the group consisting of hydroxyl, halogen and epoxy, in the presence of an acid acceptor, thus producing said 1,3,5,-tris(carboxy)hexahydro-s-triazine ester in high yield.

3. The method of preparing 1,3,5-tris(carbalkoxy)-hexahydro-s-triazines, which comprises reacting one mole of ammonia and one mole of formaldehyde in aqueous solution at a temperature not in excess of 25° C., immediately reacting the resulting product mixture in cold aqueous solution with one mole of an alkyl chloroformate of up to 19 carbon atoms in the presence of one equivalent of an inorganic base as acid acceptor, thus producing said 1,3,5-tris(carbalkoxy)hexahydro-s-triazine in high yield.

4. The method of claim 1, wherein said organic chloroformate is butyl chloroformate.

5. The method of claim 1, wherein said organic chloroformate is 2-ethylhexyl chloroformate.

6. The method of claim 1, wherein said organic chloroformate is allyl chloroformate.

References Cited in the file of this patent

UNITED STATES PATENTS

| | | |
|---|---|---|
| 2,297,531 | Bock | Sept. 29, 1942 |
| 2,382,792 | Howland | Aug. 14, 1945 |
| 2,527,240 | Baird et al. | Oct. 24, 1950 |
| 2,568,608 | Bralley | Sept. 18, 1951 |
| 2,572,843 | MacDonald | Oct. 30, 1951 |
| 2,651,658 | Bohl | Sept. 8, 1953 |
| 2,794,810 | Cusic | June 4, 1957 |

OTHER REFERENCES

Marvel et al.: Journal of the American Chemical Society, volume 68, pages 1681 to 1683 and 1685 (1946).

Richmond et al.: Journal of the American Chemical Society, volume 70, pages 3660 (1948).

Bergmann: The Chemistry of Acetylene and Related Compounds, page 80, Interscience Publishers, Inc., New York (1948).

Zigeumer et al.: Monatshefte für Chemie, volume 83, pages 1326–1333 (1952).

Gleim: Jour. of the Am. Chem. Soc., volume 76, pages 107–11 (1954).

Migrdichian: Organic Synthesis, volume 1, page 467, Reinhold Publishing Corp., New York (1957).

UNITED STATES PATENT OFFICE
CERTIFICATE OF CORRECTION

Patent No. 3,108,101                            October 22, 1963

Donald K. George et al.

It is hereby certified that error appears in the above numbered patent requiring correction and that the said Letters Patent should read as corrected below.

Column 5, line 14, for "12.18" read -- 121.8 --.

Signed and sealed this 14th day of April 1964.

(SEAL)
Attest:
ERNEST W. SWIDER                          EDWARD J. BRENNER

Attesting Officer                               Commissioner of Patents